United States Patent
Sood et al.

(10) Patent No.: US 8,345,712 B2
(45) Date of Patent: Jan. 1, 2013

(54) METHOD, APPARATUS AND SYSTEM FOR MAINTAINING MOBILITY RESISTANT IP TUNNELS USING A MOBILE ROUTER

(75) Inventors: Kapil Sood, Beaverton, OR (US); Jesse R. Walker, Portland, OR (US); Tsung-Yuan Tai, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/323,890

(22) Filed: Dec. 13, 2011

(65) Prior Publication Data

US 2012/0084411 A1    Apr. 5, 2012

Related U.S. Application Data

(63) Continuation of application No. 11/233,167, filed on Sep. 21, 2005, now Pat. No. 8,121,146.

(51) Int. Cl.
*H04J 3/16*    (2006.01)
*G06F 15/16*    (2006.01)

(52) U.S. Cl. ........ 370/466; 370/349; 370/389; 370/392; 709/219; 709/203; 709/227; 455/27

(58) Field of Classification Search .............. 370/466, 370/467, 465, 349, 352, 389, 392, 328, 338; 709/219, 203, 227; 455/427
See application file for complete search history.

(56) References Cited

U.S. PATENT DOCUMENTS

| | | | |
|---|---|---|---|
| 6,591,306 B1 | 7/2003 | Redlich | |
| 7,565,413 B1 * | 7/2009 | O'Toole, Jr. | 709/219 |
| 2003/0005100 A1 | 1/2003 | Barnard et al. | |
| 2003/0117965 A1 * | 6/2003 | Markki et al. | 370/254 |
| 2004/0078600 A1 | 4/2004 | Nilsen et al. | |
| 2005/0013280 A1 * | 1/2005 | Buddhikot et al. | 370/349 |
| 2006/0094421 A1 * | 5/2006 | Munje et al. | 455/427 |

FOREIGN PATENT DOCUMENTS

| | | |
|---|---|---|
| WO | 0242861 A2 | 5/2002 |
| WO | 2007038034 A1 | 4/2007 |

OTHER PUBLICATIONS

PCT International Search Report (dated Jan. 22, 2007), International Application No. PCT/US2006/036154—International Filing Date Sep. 14, 2006, (14 pages).

Shneyderman, Alex, et al., "Mobile VPNs for Next Generation GPRS and UMTS Networks", White Paper Lucent Technologies, 2000, XP002963845, (15 pages).

Tessier, S., "Guidelines for Mobile IP and IPSec VPN Usage", IETF Standard-Working-Draft, Internet Engineering Task Force, IETF, CH, No. 1, Dec. 2002, XP015005480, ISSN: 0000-00004, (8 pages).

(Continued)

*Primary Examiner* — Michael Thier
*Assistant Examiner* — Jamal Javaid
(74) *Attorney, Agent, or Firm* — Barnes and Thornburg LLP

(57) ABSTRACT

A method, apparatus and system enable a mobile device to roam while maintaining a persistent IP tunnel. Specifically, a mobile router may be utilized to enable a mobile device to maintain a persistent IP tunnel while the device roams. In one embodiment, the mobile device is a virtual host and the mobile router is a virtual mobile router.

13 Claims, 6 Drawing Sheets

OTHER PUBLICATIONS

International Preliminary Report on Patentability and written opinion received for PCT Patent Application No. PCT/ US2006/036154, mailed on Apr. 3, 2008, 9 pages.
Office Action for Chinese Patent Application No. 200680034725.6, mailed on Sep. 9, 2010, 16 pages including 8 pages of unofficial English Translation.
Office Action received for European Patent Application No. 06814799.0, mailed on Jan. 28, 2009, 2 pages.
Office Action for Chinese Patent Application No. 200680034725.6, mailed on Aug. 10, 2011, 15 pages. including 7 pages of unofficial English Translation.

* cited by examiner

METHOD, APPARATUS AND SYSTEM FOR MAINTAINING MOBILITY RESISTANT IP TUNNELS USING A MOBILE ROUTER

CROSS-REFERENCE TO RELATED U.S. PATENT APPLICATION

This application is a continuation application of U.S. application Ser. No. 11/233,167 entitled "METHOD, APPARATUS AND SYSTEM FOR MAINTAINING MOBILITY RESISTANT IP TUNNELS USING A MOBILE ROUTER," which was filed on Sep. 21, 2005 and is now U.S. Pat. No. 8,121,146.

BACKGROUND

Use of mobile computing devices (hereafter "mobile nodes") such as laptops, notebook computers, personal digital assistants ("PDAs") and cellular telephones is becoming increasingly popular today. These mobile nodes enable users to move from one location to another ("roam"), while continuing to maintain their connectivity to the same network. Given its increasing popularity, it is unsurprising that most corporate ("enterprise") networks today attempt to facilitate fast and secure mobile computing.

In order to roam freely, networks typically conform to one or more industry-wide mobile internet protocol ("IP") standards. More specifically, the Internet Engineering Task Force ("IETF") has promulgated roaming standards (Mobile IPv4, IETF RFC 3344, August 2002) and Mobile IPv6, IETF Mobile IPv6, Internet Draft draft-ietf-mobileip-ipv6-24.txt, June 2003) to enable mobile node users to move from one location to another while continuing to maintain their current connectivity to the same network, and/or to the networked devices (e.g., printers). These industry standards have unfortunately encountered various adoption and implementation problems. As a result, although these standards exist, there is still a need for one or more schemes to enable mobile nodes to roam easily.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Embodiments of the present invention provide a method, apparatus and system for mobile nodes to maintain a consistent IP tunnel while roaming across networks. More specifically, embodiments of the present invention utilize a mobile IP router to enable mobile nodes to maintain a consistent IP tunnel, while roaming across networks. The phrase "roaming across networks" is well known to those of ordinary skill in the art and includes roaming from one subnet to another on a single network (e.g., moving within a single building having multiple access points), roaming from one type of network to another (e.g., an 802.11 [Institute of Electrical and Electronics Engineers ("IEEE") Std 802.11-1999 (Reaff 2003),] network to an 802.16 [IEEE Std 802.16-2004] network) and/or roaming from one location to another (e.g., roaming from a company to a residence, which may include changing access points and/or changing network types). Reference in the specification to "one embodiment" or "an embodiment" of the present invention means that a particular feature, structure or characteristic described in connection with the embodiment is included in at least one embodiment of the present invention. Thus, the appearances of the phrases "in one embodiment," "according to one embodiment" or the like appearing in various places throughout the specification are not necessarily all referring to the same embodiment.

Figure 1:
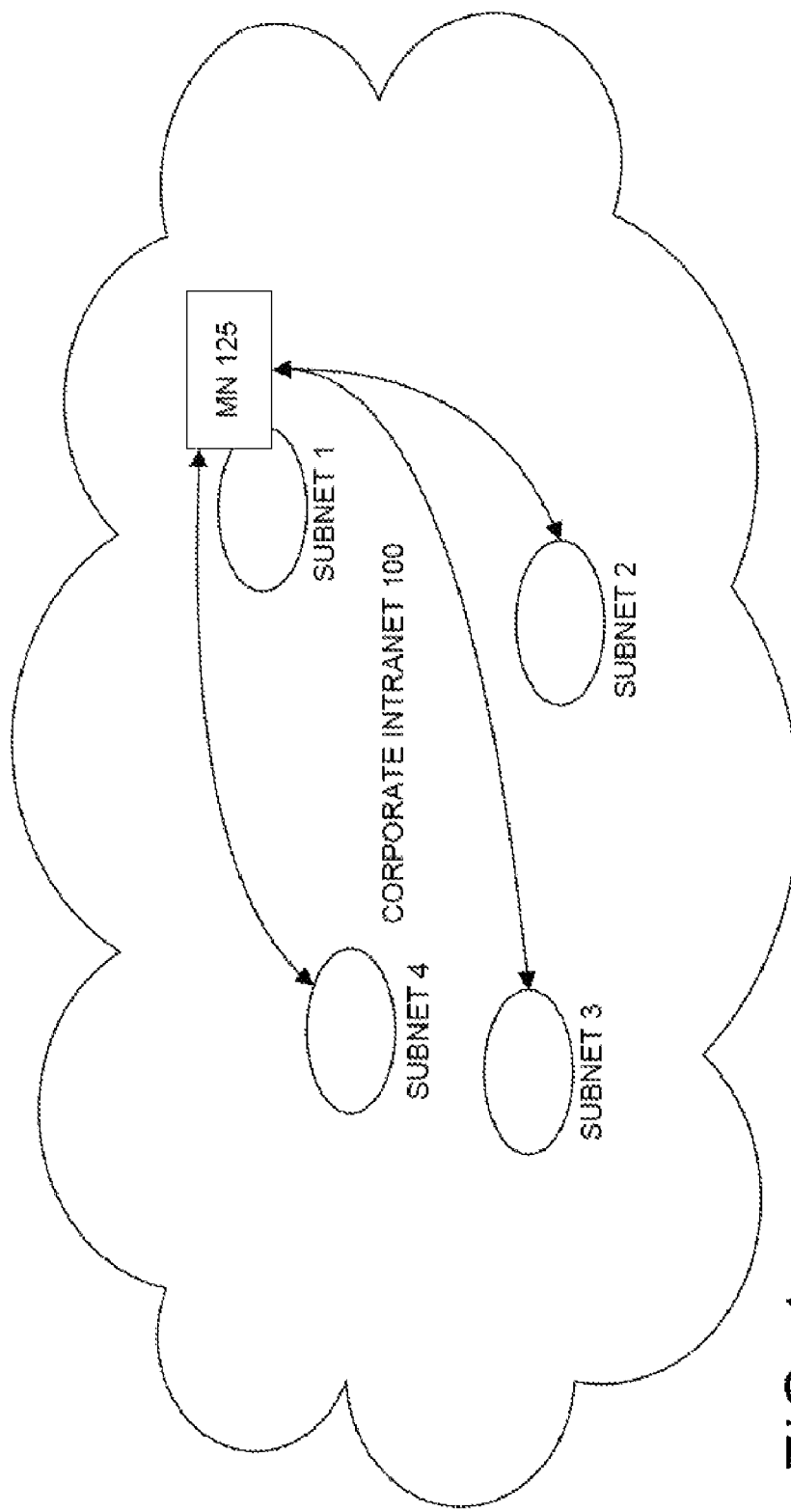
FIG. 1 illustrates a known corporate intranet structure.
Figure 2:
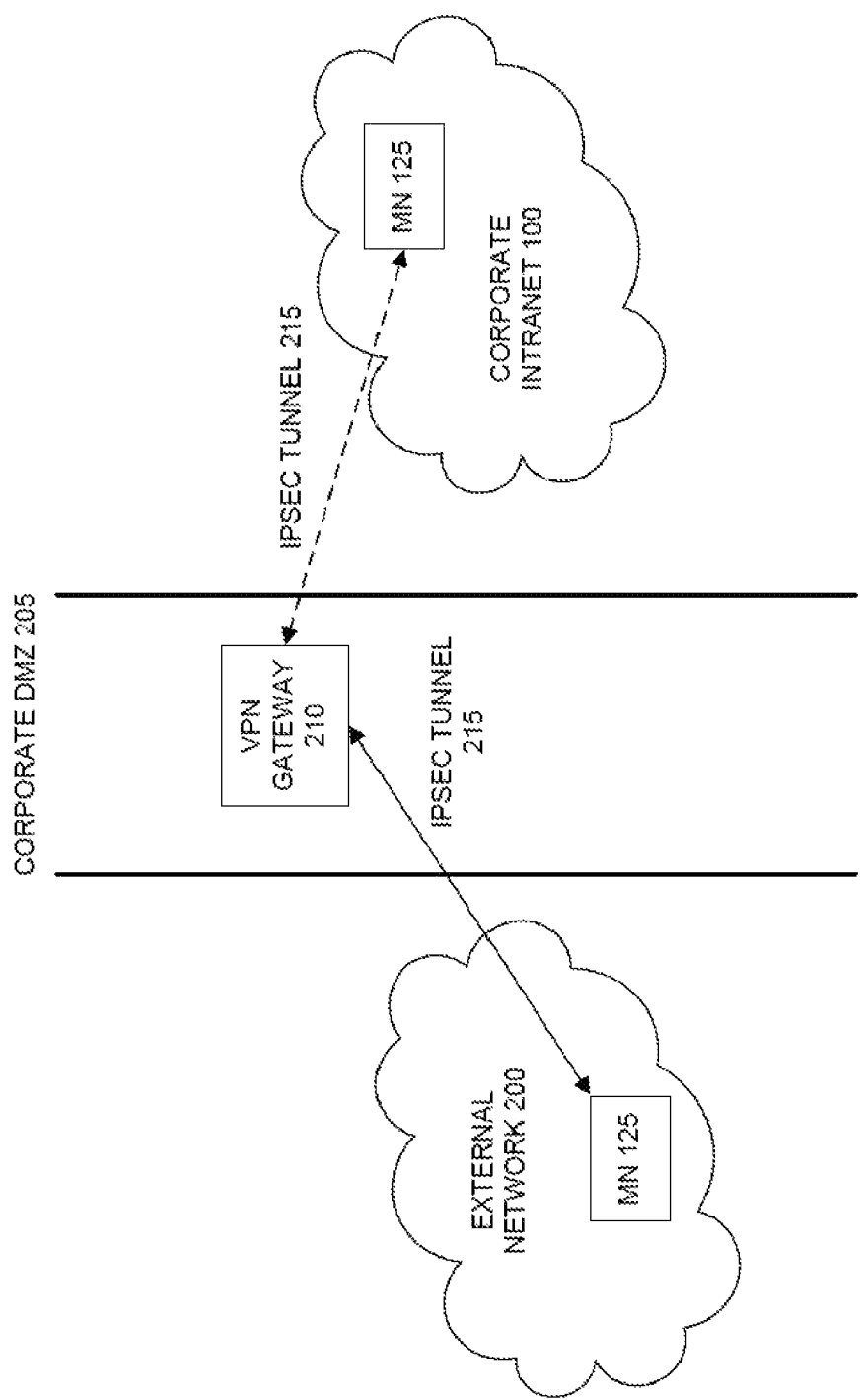
FIG. 2 illustrates a known enterprise network topology.

In order to facilitate understanding of embodiments of the present invention, FIG. 1 and FIG. 2 describe typical network topologies and roaming scenarios. Specifically, FIG. 1 illustrates a known corporate intranet ("Corporate Intranet 100") structure. Corporate Intranet 100 may include both wired and wireless networks and may comprise multiple subnets. A subnet refers to a portion of an organization's network interconnected to other subnets by a routing element. Subnets are well known to those of ordinary skill in the art and further description thereof is omitted herein. Within Corporate Intranet 100, a mobile node ("MN 125") may roam across subnets (illustrated as Subnets 1-4) when a user moves from one location to another (e.g., from one conference room to another and/or from one building to another).

Corporate Intranet 100 may, however, also be connected to an external network, such as the Internet, and MN 125 may roam between Corporate Intranet 100 and the external network. FIG. 2 illustrates a known network topology today, comprising Corporate Intranet 100, separated from an external network ("External Network 200") by a corporate demilitarized zone 205 ("Corporate DMZ 205"). Corporate DMZ 205 is well known to those of ordinary skill in the art and further description of such is omitted herein. Similar to Corporate Intranet 100, External Network 200 may also include both wired and wireless networks and comprise multiple subnets and/or access points. For security purposes, Corporate DMZ 205 is likely to include security gateways such as Virtual Private Network ("VPN") gateways (collectively illustrated in FIG. 2 as "VPN Gateway 210") to protect Corporate Intranet 100 from External Network 200. VPN Gateway 210 also provides a secure means of communication between nodes on Corporate Intranet 100 and nodes on External Network 200 by encrypting the packets between the nodes on External Network 200 and Corporate Intranet 100. Since VPNs are likely to include security features such as IP Security ("IPSec") and Secure Socket Layer/Transport Layer Security ("SSL/TLS") security, all references herein to VPNs shall include IPSec-based VPNs and/or SSL/TLS-based VPNs, but embodiments of the present invention are not so limited. VPN gateways, SSL/TLS and IPSec are well known to those of ordinary skill in the art and further description thereof is omitted herein.

Typically, when MN 125 roams from Corporate Intranet 100 to External Network 200 or from access point to access point on Corporate Intranet 100 and/or on External Network 200, MN 125 may be required to establish an IPSec tunnel ("IPSec Tunnel 215") to VPN Gateway 210 in order to securely access the corporate network. As is well known to those of ordinary skill in the art, IP tunnels such as IPSec are statically bound to fixed IP addresses at the time the tunnel is established. In other words, the binding of IPSec VPN tunnels is between the IP addresses of MN 125 and VPN Gateway 210 and if either of these IP addresses changes, the IPSec tunnel has to be renegotiated. As MN 125 roams from one location to another, its IP address typically changes, thus necessitating tear down of the existing IPSec tunnel and establishment of a new IPSec tunnel. This constant need to renegotiate IPSec VPN tunnels may cause a significantly degraded user experience, due to the latency in performing elaborate VPN tunnel setup procedures. Additionally, the constant need to renegotiate VPN tunnels may also disrupt and break many applications that rely on these tunnels. For example, corporate applications such as email and voice-over-IP ("VoIP") services may experience problems when a user roams from network to network.

Embodiments of the present invention enhance the usability of mobile nodes by providing a method, apparatus and system for maintaining a consistent IP tunnel while roaming across networks. More specifically, according to an embodiment of the present invention, a mobile router ("MR") may enable existing VPN tunnels to persist, even when MN 125 roams, i.e., as MN 125's IP address changes. It will be readily apparent to those of ordinary skill in the art that embodiments of the invention may be implemented in hardware, software, firmware and/or any combination thereof. Although the following description assumes that the MR is implemented in a "mobile" node, embodiments of the present invention are not so limited and may have other applicability (e.g., in scenarios where a computing device has multiple IP interfaces and the platform moves from one interface to another).

Additionally, although the following description assumes a virtualized environment, embodiments of the invention are not so limited. Instead, embodiments of the invention may have applicability within other environments such as in multi-core processing devices and/or devices having specialized processors dedicated to managing the platform. Other embodiments may include using Intel Corporation's Active Management Technologies ("AMT"), "Manageability Engine" ("ME"), Platform Resource Layer ("PRL") and/or other comparable or similar technologies. Embodiments of the present invention may additionally include various personal devices, i.e., devices coupled to the mobile node. Thus, for example, although the following description assumes VMs on a host, instead of or in addition to a VM, one embodiment of the invention may include a personal digital assistant coupled to a mobile node and/or a cell phone coupled to the mobile node. Finally, although the following description assumes that a mobile node is moving from one location to another within a single network, other embodiments of the invention may include a mobile node moving from one type of network to another (e.g., from an 802.11 to an 802.16 network).

Figure 3:
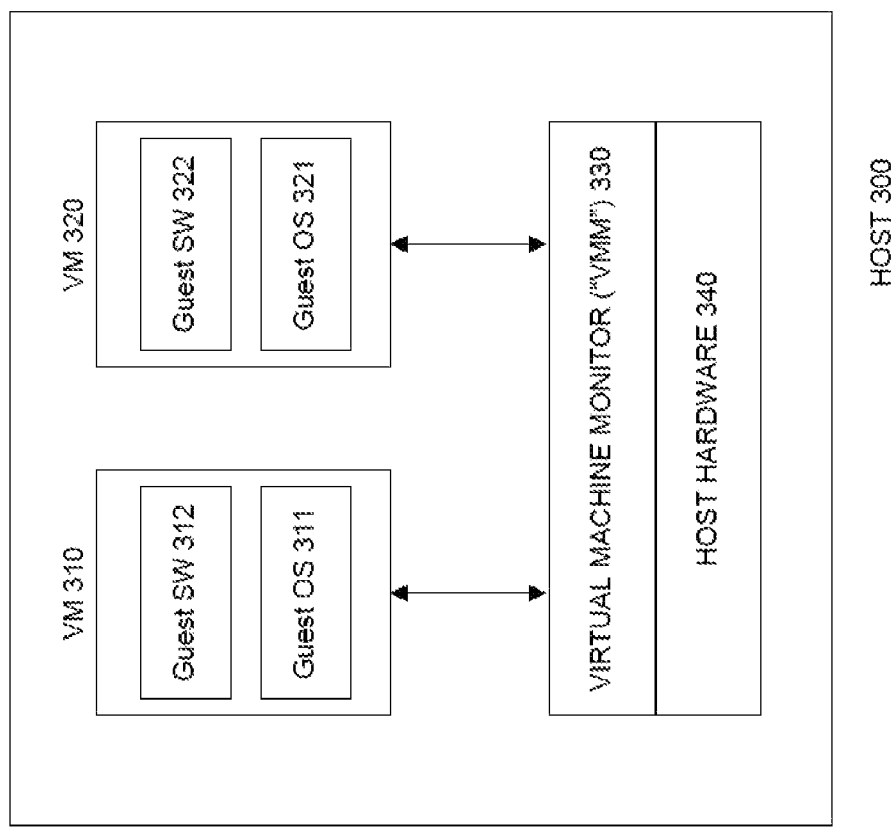
FIG. 3 illustrates a typical virtual machine host.

In order to facilitate understanding of embodiments of the invention, FIG. 3 illustrates an example of a typical virtual machine host platform ("Host 300"). One aspect of virtualization technology enables a single host computer running a virtual machine monitor ("VMM") to present multiple abstractions and/or views of the host, such that the underlying hardware of the host appears as one or more independently operating virtual machines ("VMs"). A virtual-machine monitor (illustrated as "VMM 330") typically runs on the host platform and presents an abstraction(s) and/or view(s) of the platform (also referred to as "virtual machines" or "VMs") to other software. Although only two VM partitions are illustrated ("VM 310" and "VM 320", hereafter referred to collectively as "VMs"), these VMs are merely illustrative and additional virtual machines may be added to the host. VMM 330 may be implemented in software (e.g., as a standalone program and/or a component of a host operating system), hardware, firmware and/or any combination thereof.

VM 310 and VM 320 may function as self-contained platforms respectively, running their own "guest operating systems" (i.e., operating systems hosted by VMM 330, illustrated as "Guest OS 311" and "Guest OS 321" and hereafter referred to collectively as "Guest OS") and other software (illustrated as "Guest Software 312" and "Guest Software 322" and hereafter referred to collectively as "Guest Software"). Each Guest OS and/or Guest Software operates as if it were running on a dedicated computer rather than a virtual machine. That is, each Guest OS and/or Guest Software may expect to control various events and have access to hardware resources on Host 300. Within each VM, the Guest OS and/or Guest Software may behave as if they were, in effect, running on Host 300's physical hardware ("Host Hardware 340").

Figure 4:
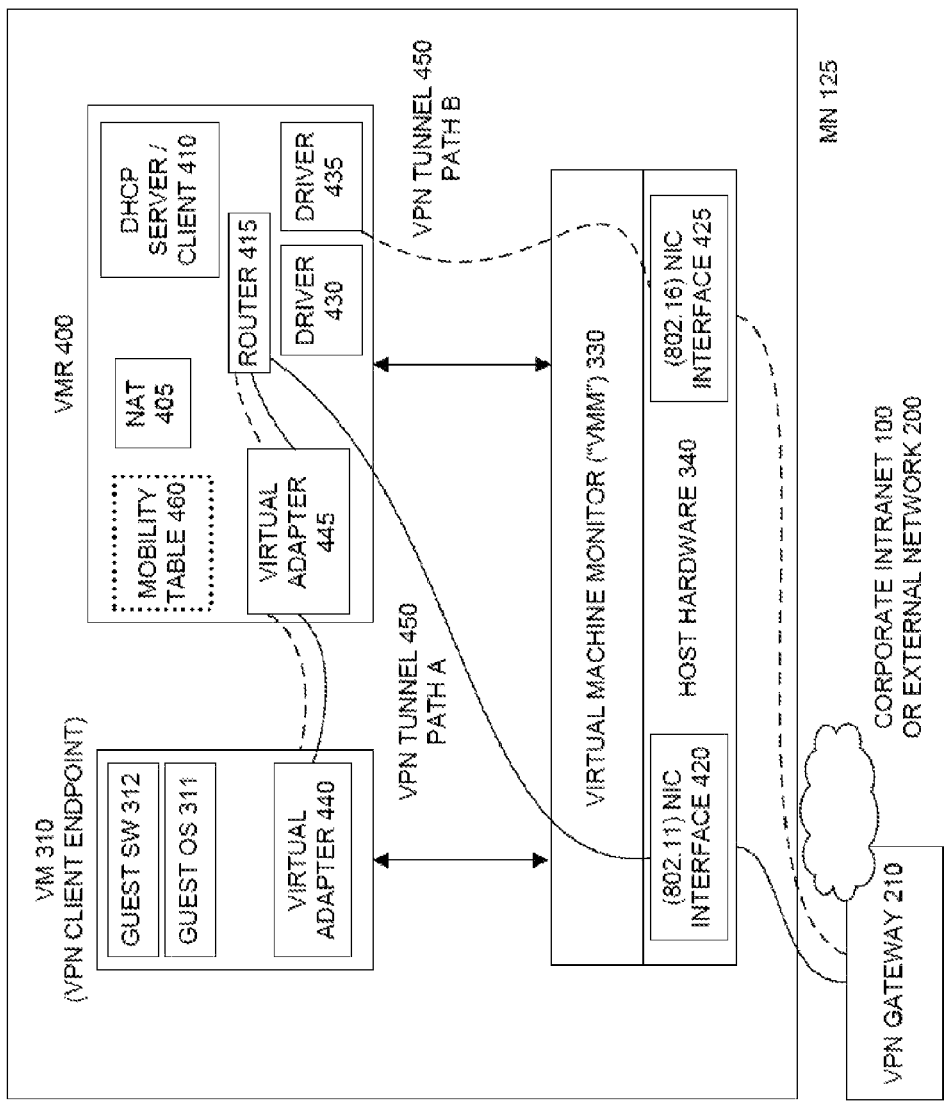
FIG. 4 illustrates an embodiment of the present invention.

According to embodiments of the present invention, a virtual machine host as described above may be leveraged to enable mobile nodes to maintain a persistent VPN tunnel while roaming. FIG. 4 illustrates an embodiment of the present invention. As illustrated, MN 125 comprises a virtual machine host wherein one of the partitions on the device (previously VM 320) is dedicated to function as a virtual MR ("VMR 400") while VM 310 comprises a VPN client endpoint. Typically, each VM on a virtual host may be assigned a virtual (internal) IP address. Thus, for example, VM 310 may typically have a virtual IP address assigned to it. Additionally, VMR 400 may be assigned the physical Network Interface Card ("NIC") interfaces (e.g., NIC Interface 420 and NIC Interface 425 in Host Hardware 340) on MN 125, including the drivers associated with the interfaces (e.g., Driver 430 and Driver 435, respectively). VMM 330 may present VM 310 and VMR 400 with virtual versions of the interfaces (illustrated as "Virtual Adapter 440" and "Virtual Adapter 445" respectively). In other words, according to embodiments of the present invention, VMR 400 may own the physical NIC interfaces on MN 125 and VM 310 sees only a virtual version of the interfaces. Thus, according to one embodiment, VMR 400 acts as a dedicated partition for all NICs on MN 125.

DHCP Server/Client 410 may function as a DHCP server for MN 125 internally (i.e., it may allocate internal IP addresses on request) and a DHCP client otherwise (e.g., requesting external IP addresses for MN 125 from other DHCP servers on Corporate Intranet 100 or External Network 200). According to an embodiment of the present invention, Guest OS 311 may request an IP address for VM 310. This request may be intercepted by VMR 400 and DHCP Server/Client 410 may assign Guest OS 311 an "internal" address. Similarly, VMR 400 may request an IP address from a DHCP server on Corporate Intranet 100 or External Network 200. In this example, the request from VM 310 is assumed to be for Interface 420 (e.g., an 802.11 interface). Upon receipt of an address from the DHCP server on External network 200 ("external" IP address, hereafter referred to as the "Original Address"), VM 310 may establish VPN Tunnel 450 with VPN Gateway 210 using the Original Address. In one embodiment, NAT 405 may perform address translations and store all IP addresses for VPN Tunnel 450. All network traffic between VM 310 and VPN Gateway 210 may thereafter be encrypted and transmitted to and from via VPN Tunnel 450 (Path A, solid line in FIG. 4).

In one example, to illustrate how embodiments of the present invention maintain VPN Tunnel 450, MN 125 is assumed to roam to a new IP subnet. In one embodiment, MN 125 may move from one subnet to another, while in an alternate embodiment, VMR 400 may be configured to recognize a new network type and make the determination whether to move from one network type to another (e.g., an 802.11 network to an 802.16 network). It will be readily apparent to those of ordinary skill in the art that VMR 400 may be configured according to various predetermined schemes. As a result of the roaming, VMR 400 may be assigned a new IP address (hereafter referred to as the "New Address") by the new subnet or network. If MN 125 is roaming within the same network, this New Address may be assigned to Interface 420 but if MN 125 roams to a different network and has to use a different wireless interface (e.g., NIC Interface 425 corresponding to the 802.16 NIC), the New Address may be assigned to the new interface. Regardless, as a result of roaming, VMR 400 now has a new address. Typically, at this point, MN 125 tears down VPN Tunnel 450 (established between VPN Gateway 210 and the now-obsolete Original Address) and reestablishes a new VPN tunnel (between VPN Gateway 210 and the New Address).

According to embodiments of the present invention, however, to eliminate the need to tear down and reestablish VPN Tunnel 450 and to avoid problems for VoIP and other applications when roaming across IP networks, VMR 400 may detect the oncoming transition to a new network and perform a DHCP renew of the Original Address and save this Original Address in a "mobility table" 460. A mobility table, as used herein, may include any type of data structure (e.g., buffered information, a table, etc.). In one embodiment, the mobility table 460 may be a data structure that is maintained only for a predetermined period. The Original Address lease time may also be noted to ensure that the subnet does not allocate this IP address to any new client during this predetermined period.

VMR 400 may then request a New Address from the DHCP Server/Client 410 and send a "route update" message (via Router 415) to other routers on External Network 200 to publish its New Address as the route for its Original Address. As a result, the route update takes effect in the network, i.e., the network views Router 415 in VMR 400 as the router for the Original Address and packets destined for the Original Address are now routed to Router 415 in VMR 400, which in turn routes the packets to the New Address (illustrated as Path B in FIG. 4). It will be readily apparent to those of ordinary skill in the art that various routing algorithms may be used to update the route on External Network 200 without departing from the spirit of embodiments of the present invention. It will be additionally apparent to those of ordinary skill in the art that according to the embodiment described above, the internal IP addresses for the VMs do not change, i.e., Guest OS 311 and VPN Gateway 210 are unaware that Original Address has changed.

A significant advantage of embodiments of the present invention is that no complex tunneling protocols are required, unlike typical Mobile IP schemes, to make roaming transparent to Guest OS 311 applications (e.g., VoIP and/or multimedia applications). According to embodiments of the invention, each mobile device having a mobile router may be self-reliant. As previously described, although the above description assumes the use of a virtual machine host, embodiments of the present invention are not so limited. Thus, for example, one embodiment of the invention may be implemented on a mobile device having a multi-core processor. According to this embodiment, one core of the multi-core processor may be dedicated to provide the mobile router functionality described herein while the remaining processors remain unchanged. Similarly, in an alternate embodiment, special purpose hardware may be added to a device to enable a mobile router to be implemented while allowing the main processor(s) to remain unchanged.

Figure 5:
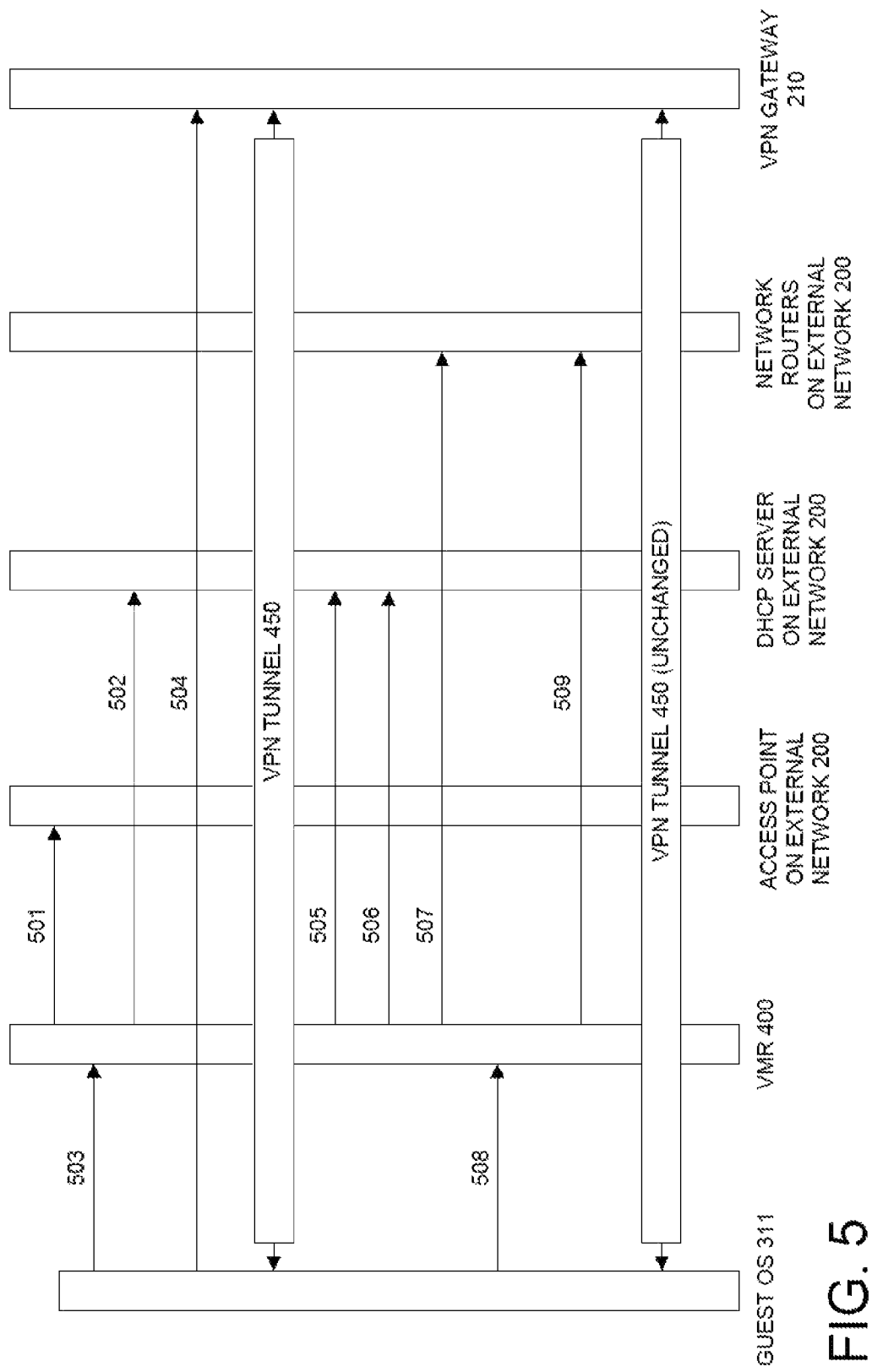
FIG. 5 is a sequence diagram illustrating conceptually an embodiment of the present invention.

FIG. 5 is a sequence diagram illustrating conceptually an embodiment of the present invention. When MN 125 initially starts up, Guest OS 311 in VM 310 may attempt to connect to the network. In one embodiment, in 501, this request to connect is routed from VMR 400 to an access point on Corporate Intranet 100 or External Network 200 via a network interface (e.g., Interface 420, the 802.11 interface). In 502, DHCP Server/Client 410 in VMR 400 (acting as a DHCP client) may issue a request to a DHCP server on Corporate Intranet 100 or External Network 200 for an external network address. In 503, in response to Guest OS 311's request for an IP address, DHCP Server/Client 410 in VMR 400 (acting as a DHCP server) may also provide VM 310 with an internal IP address. Upon receipt of the external IP address (Original Address), Guest OS 311 may establish an IPSec VPN tunnel (VPN Tunnel 450) with VPN Gateway 210 in 504, while NAT 405 in VMR 400 performs address translations (e.g., translating the internal IP address to the external IP address) and stores the addresses for VPN Tunnel 450. VPN Tunnel 450 thus comprises the external address assigned to VMR 400 (Original Address) on one end and VPN Gateway 210's address on the other end.

When MN 125 moves to a different subnet or network, in 505, DHCP Server/Client 410 in VMR 400 may request a new IP address from a DHCP server on Corporate Intranet 100 or External Network 200. VMR 400 may then in 506 maintain Original Address in its mobility table 460 while updating NAT 405 with the new IP address (New Address). In 507, Router 415 in VMR 400 may send a "route update" message to other routers on Corporate Intranet 100 and/or External Network 200 to publish its New Address as the route for its Original Address. Since NAT 405 in VMR 400 continues to perform address translation (i.e., translating New Address into the internal IP address assigned to VM 310), VPN Tunnel 450 appears to Guest OS 311 and VPN Gateway 210 to be unchanged. As a result, when IPSec packets are transmitted from Guest OS 311 in 508, the packets may continue to be routed in 509 by Router 415 in VMR 400 through VPN Gateway 210.

Figure 6:
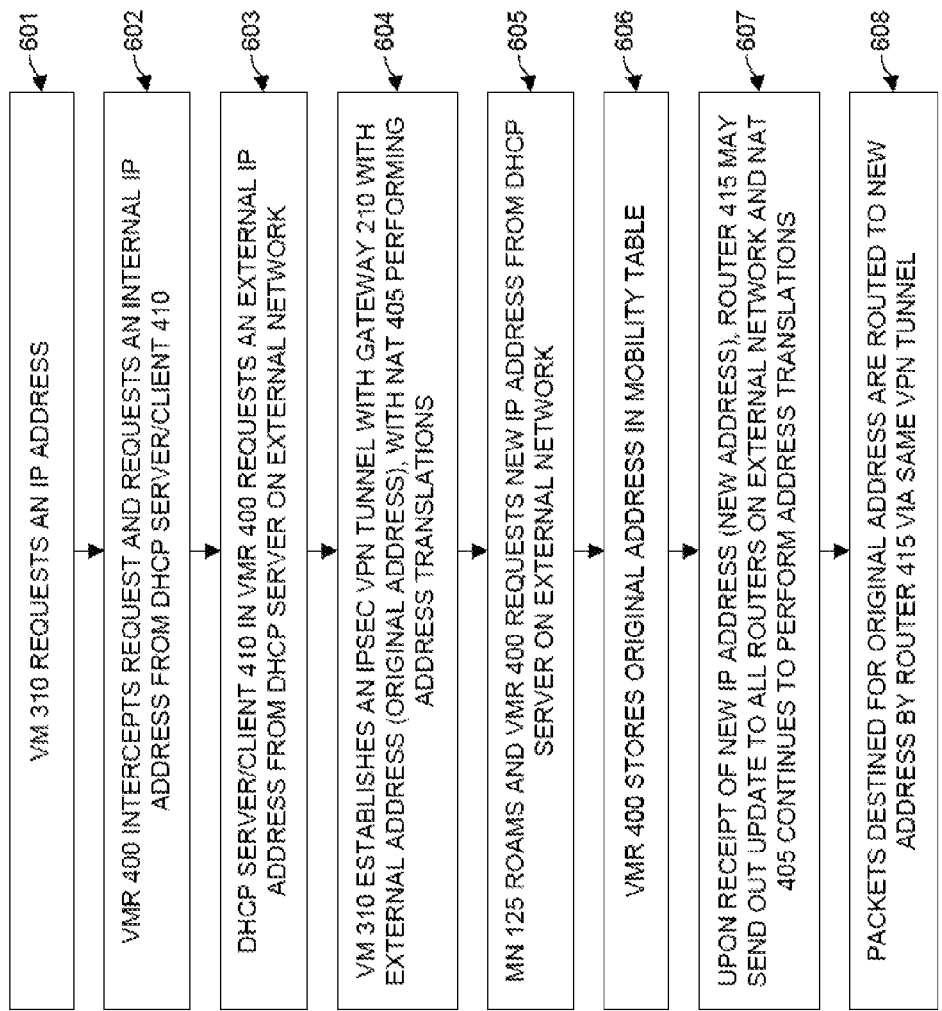
FIG. 6 is a flow chart illustrating an embodiment of the present invention.

FIG. 6 is a flowchart illustrating an embodiment of the present invention. In 601, when MN 125 first starts up on the network, VM 310 requests an IP address. In 602, VMR 400 may intercept this request and request an internal IP address from DHCP Server/Client 410. In 603, DHCP Server/Client 410 may also request an external IP address from DHCP servers on the network. Upon receipt of the external IP address (Original Address), in 604, VM 310 may establish an IPSec VPN tunnel with VPN Gateway 210. In 605, when MN 125 roams, VMR 400 may issue a new request for an IP address from the DHCP servers on the network. VMR 400 may additionally store Original Address in a mobility table 460 in 606. Upon receipt of the new IP address (New Address), Router 415 in VMR 400 may send out an update to all routers on the network in 607 and NAT 405 may continue to perform address translations. Thereafter, any packets destined for Original Address will be routed via Router 415 to New Address in 608. Since VMR 400 handles the address translations and routing, VM 310 and VPN Gateway 210 may not ever be aware that the external address has in fact changed due to MN 125's roaming.

The hosts according to embodiments of the present invention may be implemented on a variety of computing devices. According to an embodiment, a computing device may include various other well-known components such as one or more processors. The processor(s) and machine-accessible media may be communicatively coupled using a bridge/memory controller, and the processor may be capable of executing instructions stored in the machine-accessible media. The bridge/memory controller may be coupled to a graphics controller, and the graphics controller may control the output of display data on a display device. The bridge/memory controller may be coupled to one or more buses. One or more of these elements may be integrated together with the processor on a single package or using multiple packages or dies. A host bus controller such as a Universal Serial Bus ("USB") host controller may be coupled to the bus(es) and a plurality of devices may be coupled to the USB. For example, user input devices such as a keyboard and mouse may be included in the computing device for providing input data. In alternate embodiments, the host bus controller may be compatible with various other interconnect standards including PCI, PCI Express, FireWire and other such existing and future standards.

In the foregoing specification, the invention has been described with reference to specific exemplary embodiments thereof. It will, however, be appreciated that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A method comprising:
    intercepting, by a mobile router executing in a first virtual machine of a mobile computing device, a request for an Internet Protocol (IP) address from an operating system (OS) executing in a second virtual machine of the mobile computing device;
    assigning an internal IP address to a virtual network interface of the OS executing in the second virtual machine of the mobile computing device in response to intercepting the request for the IP address from the OS;
    translating, by the mobile router, between the internal IP address and an external IP address;
    requesting, by the mobile router of the mobile computing device, a first external IP address for a first network interface of the mobile computing device from a Dynamic Host Configuration Protocol (DHCP) server on an external network;
    establishing a secure communication tunnel between the OS executing in the second virtual machine of the mobile computing device and a remote gateway device, the secure communication tunnel is established using the first external IP address and the first network interface of the mobile computing device;
    determining that access to the external network is available through a second network interface of the mobile computing device;
    requesting, by the mobile router, a second external IP address for the second network interface of the mobile computing device from the DHCP server on the external network;
    renewing, by the mobile router, a lease corresponding to the first external IP address;
    storing the first external IP address and a lease time corresponding to the first external IP address in a mobility data structure; and
    sending, by the mobile router, a routing update message to one or more routers on the external network to route packets destined for the first external IP address to the second external IP address, wherein the one or more routers on the external network are different from the mobile router.

2. The method of claim 1, wherein translating between the internal IP address and an external IP address comprising translating between the internal IP address and the first external IP address.

3. The method of claim 1, wherein the first network interface is an 802.11 network interface and the second network interface is an 802.16 network interface.

4. The method of claim 1, further comprising routing, by the mobile router, packets destined for the second external IP address to the first external IP address.

5. The method of claim 1, wherein translating between the internal IP address and an external IP address comprises translating between the second external IP address and the internal IP address.

6. The method of claim 1, further comprising executing the mobile router on a dedicated processing core of a multi-core processor of the mobile computing device.

7. A system comprising
    a guest operating system (OS) executing in a first virtual machine of a mobile computing device, the guest OS associated with a virtual network interface; and
    a mobile router executing in a second virtual machine of the mobile computing device, the mobile router to:
    intercept a request for an Internet Protocol (IP) address from the guest OS executing in the first virtual machine of the mobile computing device,
    assign an internal IP address to the virtual network interface of the guest OS in response to intercepting the request for the IP address from the guest OS,
    translate between the internal IP address and an external IP address,
    request a first external IP address for a first network interface of the mobile computing device from a Dynamic Host Configuration Protocol (DHCP) server on an external network,
    establish a secure communication tunnel between the guest OS executing in the first virtual machine and a remote gateway device, the secure communication tunnel is established using the first external IP address and the first network interface of the mobile computing device,
    determine that access to the external network is available through a second network interface of the mobile computing device,
    request a second external IP address for the second network interface of the mobile computing device from the DHCP server on the external network,
    renew a lease corresponding to the first external IP address,
    store the first external IP address and a lease time corresponding to the first external IP address in a mobility data structure, and
    send a routing update message to one or more routers on the external network to route packets destined for the first external IP address to the second external IP address, wherein the one or more routers on the external network are different from the mobile router.

8. The system of claim 7, wherein to translate between the internal IP address and an external IP address comprises to translate between the internal IP address and the first external IP address.

9. The system of claim 7, wherein the first network interface is an 802.11 network interface and the second network interface is an 802.16 network interface.

10. The system of claim 7, wherein the mobile router to further route packets destined for the second external IP address to the first external IP address.

11. The system of claim 7, wherein to translate between the internal IP address and an external IP address comprises to translate between the second external IP address and the internal IP address.

12. At least one non-transitory, machine-accessible media comprising a plurality of instructions that in response to being executed result in a computing device:

intercepting, by a mobile router executing in a first virtual machine of the computing device, a request for an Internet Protocol (IP) address from an operating system (OS) executing in a second virtual machine of the computing device;

assigning an internal IP address to a virtual network interface of the OS executing in the second virtual machine of the computing device in response to intercepting the request for the IP address;

translating, by the mobile router, between the internal IP address and an external IP address;

requesting, by the mobile router of the computing device, a first external IP address for a network interface of the computing device from a Dynamic Host Configuration Protocol (DHCP) server on a first external network;

establishing a secure communication tunnel between the OS executing in the second virtual machine of the computing device and a remote gateway device, the secure communication tunnel is established using the first external IP address;

detecting an oncoming transition of the computing device from the first external network to a second external network;

requesting, by the mobile router, a second external IP address for the network interface of the computing device from a DHCP server on the second external network;

renewing, by the mobile router, a lease corresponding to the first external IP address;

storing the first external IP address and a lease time corresponding to the first external IP address in a mobility data structure; and sending, by the mobile router, a routing update message to one or more routers on the first and second external networks to route packets destined for the first external IP address to the second external IP address, wherein the one or more routers on the first and second external networks are different from the mobile router.

13. The at least one non-transitory, machine-accessible media of claim 12, wherein translating between the internal IP address and an external IP address comprises one or more of (i) translating between the first external IP address and the internal IP address; and (ii) translating between the second external IP address and the internal IP address.

* * * * *

UNITED STATES PATENT AND TRADEMARK OFFICE
CERTIFICATE OF CORRECTION

| | | |
|---|---|---|
| PATENT NO. | : 8,345,712 B2 | Page 1 of 1 |
| APPLICATION NO. | : 13/323890 | |
| DATED | : January 1, 2013 | |
| INVENTOR(S) | : Kapil Sood et al. | |

It is certified that error appears in the above-identified patent and that said Letters Patent is hereby corrected as shown below:

In claim 2, at column 7, line 65, replace "comprising" with --comprises--.

Signed and Sealed this
Nineteenth Day of March, 2013

Teresa Stanek Rea
*Acting Director of the United States Patent and Trademark Office*